United States Patent [19]

Miesak

[11] Patent Number: 5,425,117
[45] Date of Patent: Jun. 13, 1995

[54] MULTIPLE CHANNEL ROTARY OPTICAL COUPLER

[75] Inventor: Edward J. Miesak, Orlando, Fla.

[73] Assignee: University of Central Florida, Orlando, Fla.

[21] Appl. No.: 231,798

[22] Filed: Apr. 25, 1994

[51] Int. Cl.[6] ................................. G02B 6/22
[52] U.S. Cl. .......................... 385/33; 385/35
[58] Field of Search ............... 385/33, 35, 20, 21, 385/22, 24, 119, 34

[56] References Cited

U.S. PATENT DOCUMENTS

| | | | |
|---|---|---|---|
| 4,050,784 | 9/1977 | Kobayashi | 385/34 |
| 4,290,667 | 9/1981 | Chown | 385/34 |
| 4,447,114 | 5/1984 | Koene | 350/96.2 |
| 4,750,795 | 6/1988 | Blotelgaer | 385/24 |
| 4,768,883 | 9/1988 | Bhagowa et al. | 385/24 |

FOREIGN PATENT DOCUMENTS

| | | | |
|---|---|---|---|
| 0315131 | 5/1989 | European Pat. Off. | 385/33 |
| 0488205A1 | 11/1991 | European Pat. Off. | G02B 6/36 |
| 2529687 | 1/1984 | France | 385/22 |

*Primary Examiner*—Rodney B. Bovernick
*Assistant Examiner*—John Ngo
*Attorney, Agent, or Firm*—James H. Beusse

[57] ABSTRACT

A rotating optical coupler for coupling optical signals from a first set of rotating optical conductors to a second set of stationary optical conductors includes a plurality of annular lenses, each of which is optically associated with one of the optical conductors of the first set. The lenses are nested one inside another to form a lens assembly oriented in a plane perpendicular to optical axes of the lenses. A rotating holder supports each of the conductors of the first set in parallel orientation with respect to an optical axis of a central one of the annular lenses with each conductor being positioned at a different radial distance from the optical axis of the central lens. Ends of the conductors are positioned to direct light rays at a corresponding one of the annular lenses. A second stationary holder supports ends of each of the conductors of the second set at a focal point of a respective one of the annular lenses. The second holder is coupled to the lens assembly for maintaining the conductors of the second set aligned with the lenses whereby light rays from each of the conductors of the first set are focused onto an end of a respective one of the conductors of the second set regardless of the rotated position of the first set of conductors.

10 Claims, 3 Drawing Sheets

MULTIPLE CHANNEL ROTARY OPTICAL COUPLER

BACKGROUND OF THE INVENTION

The present invention relates to optical conductor systems and, more particularly, to an apparatus for unidirectional coupling of optical signals from one conductor to another conductor in which the one conductor may be rotating with respect to the another conductor.

Various methods have been implemented for coupling optical conductors in end-to-end relationship and are well known in the art. A more difficult problem arises when it is desired to couple conductors in which one conductor rotates with respect to the other conductor and in which multiple conductors are coupled. U.S. Pat. No. 4,447,114 describes one form of optical coupling mechanism for multiple optical conductors. Another form of rotary optical coupler is shown in European Patent Application No. 0488205A2. Both of these disclosed couplers require complicated optical and mechanical systems and both have relatively high internal losses.

SUMMARY OF THE INVENTION

Among the several objects of the present invention may be noted the provision of a simplified optical coupler; the provision of an optical coupler using common convex lenses; the provision of an optical coupler which functions as an optical isolator in one direction; and the provision of an optical coupler having low internal losses.

In an illustrative form, the present invention comprises a plurality of annular lenses with each lens being optically associated with a respective one of a plurality of optical conductors of a first set. Each of the lenses is nested one inside another to form a lens assembly. The first set of conductors is supported in a holding mechanism which may be rotatable and which supports the ends of the conductors at a fixed distance from the lens assembly. Each of the lenses of the assembly has an optical axis which is parallel to but offset from the optical axis of each of the other lenses. A second set of optical conductors is positioned on an opposite side of the lens assembly from the first set of conductors with each conductor of the second set having an end aligned at a focal point of a respective one of the annular lenses. In operation, light exiting each of the conductors of the first set is refracted by a respective one of the annular lenses and focused onto an end of a corresponding conductor of the second set. Preferably, each of the conductors of the first set terminates in a ball or GRIN lens which collimates the light output.

If the coupler is used in a rotatable interface, the first set of conductors are coupled to a holding mechanism which rotates about an axis centered on the lens assembly. The lens assembly and second set of conductors are fixedly connected to each other and held stationary with respect to the first set of rotating conductors. The rotating conductors are each preferably offset varying amounts from the rotating axis of the complete assembly.

The system effectively inhibits light from passing in the reverse direction through the lens assembly. Light exiting from the second set of conductors scatters over the N.A. of the conductor and only a small portion impinges on the conductor of the first set.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1A:
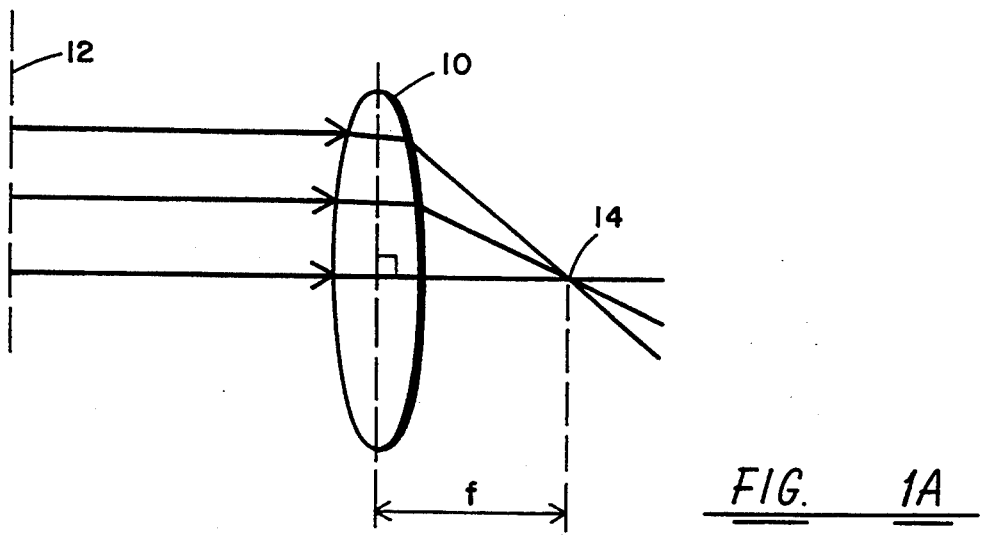
FIGS. 1A and 1B illustrate the focusing effect of a convex lens in response to a planar light wave front and a spherical light wave front, respectively.
Figure 1B:
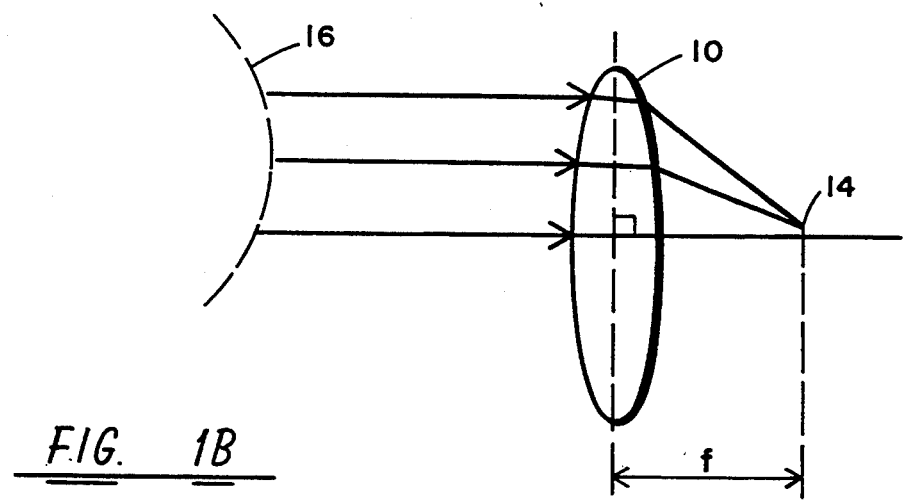

Referring to FIG. 1A, when light originating from a distant source impinges on a convex lens 10, it appears as a planar wave front 12 striking the lens. The characteristic response of the convex lens 10 is to bend the planar wave front at each point such that the light portion striking the lens is focused on a single point 14. In comparison, light from a near source tends to have a spherical wave front 16 as shown in FIG. 1B and the effect of the convex lens 10 is to "image" the light at the focal point 14 rather than to concentrate the light into a single point. The effect in FIG. 1A is useful in understanding the present invention which makes use of the fact that light striking the lens 10 at any point along a planar wave front will focus to a single focal point 14. The focal point 14 lies on the optical axis of the lens 10 at a distance determined by the curvature of the lens.

Figure 2B:
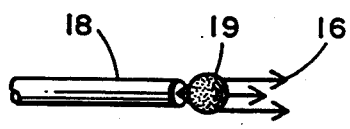
FIGS. 2A and 2B illustrate light exiting an optical conductor with and without a collimating lens, respectively.
Figure 2A:
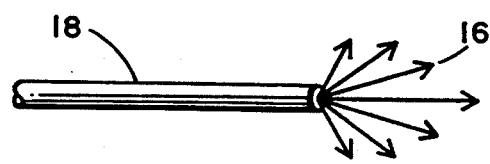

Turning now to FIG. 2A, light 16 from an optical conductor 18 (sometimes referred to as an optical fiber) exits the conductor over a broad array of angles. The light 16 exits at such angles since the transmission process through the conductor typically involves internal reflections from the sides of the conductor. FIG. 2B shows the effect of using a ball lens 19, coupled to the end of the conductor 18 to collimate light exiting the conductor. A gradient index lens, generally referred to as a GRIN lens, can also be used for this purpose. By collimating the light, the next lens in the system can collect the entire signal, which minimizes loss through the system. The light also now appears as a plane wave. Combining FIGS. 2B and 1A, it can be seen that the collimated light from conductor 18 can be directed to a focal point of the lens 10.

Figure 3:
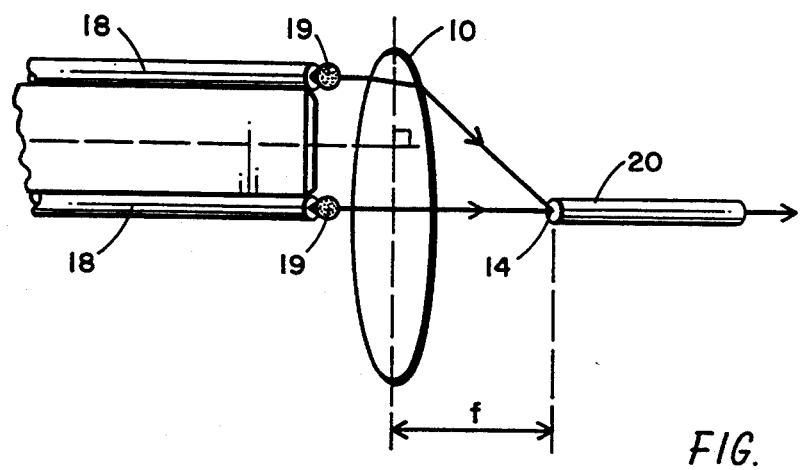
FIG. 3 illustrates how light from two displaced optical conductors focuses on a single point when passed through a common lens.

FIG. 3 shows the result of directing collimated light from conductors 18 through lens 10 onto a second conductor 20 positioned at the focal point of lens 10. Regardless of the position of conductor 18, its light output will always arrive at point 14 so long as the collimated light strikes the lens 10 parallel to the optical axis of the lens.

Figure 4:
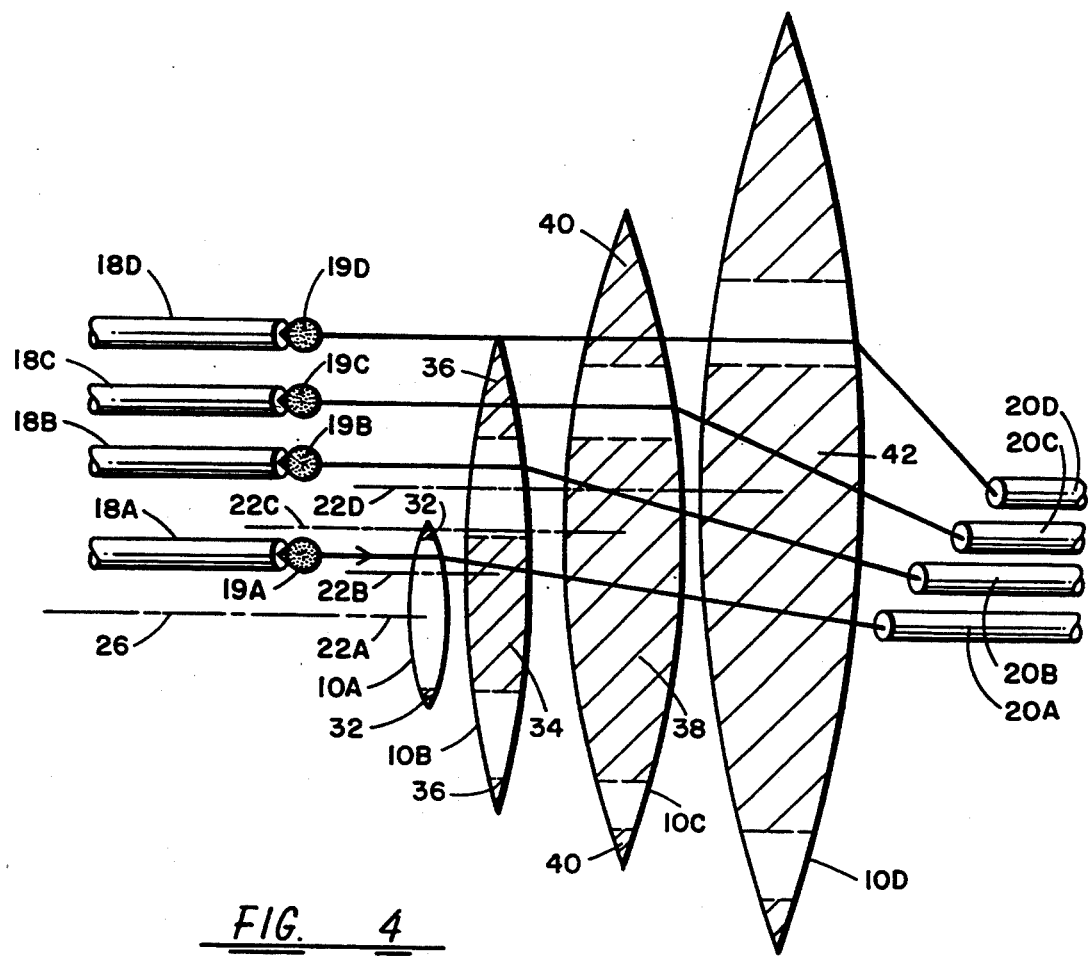
FIG. 4 is a schematic illustration of how multiple lenses can be combined to direct light from multiple conductors to other individual optical conductors.
Figure 5:
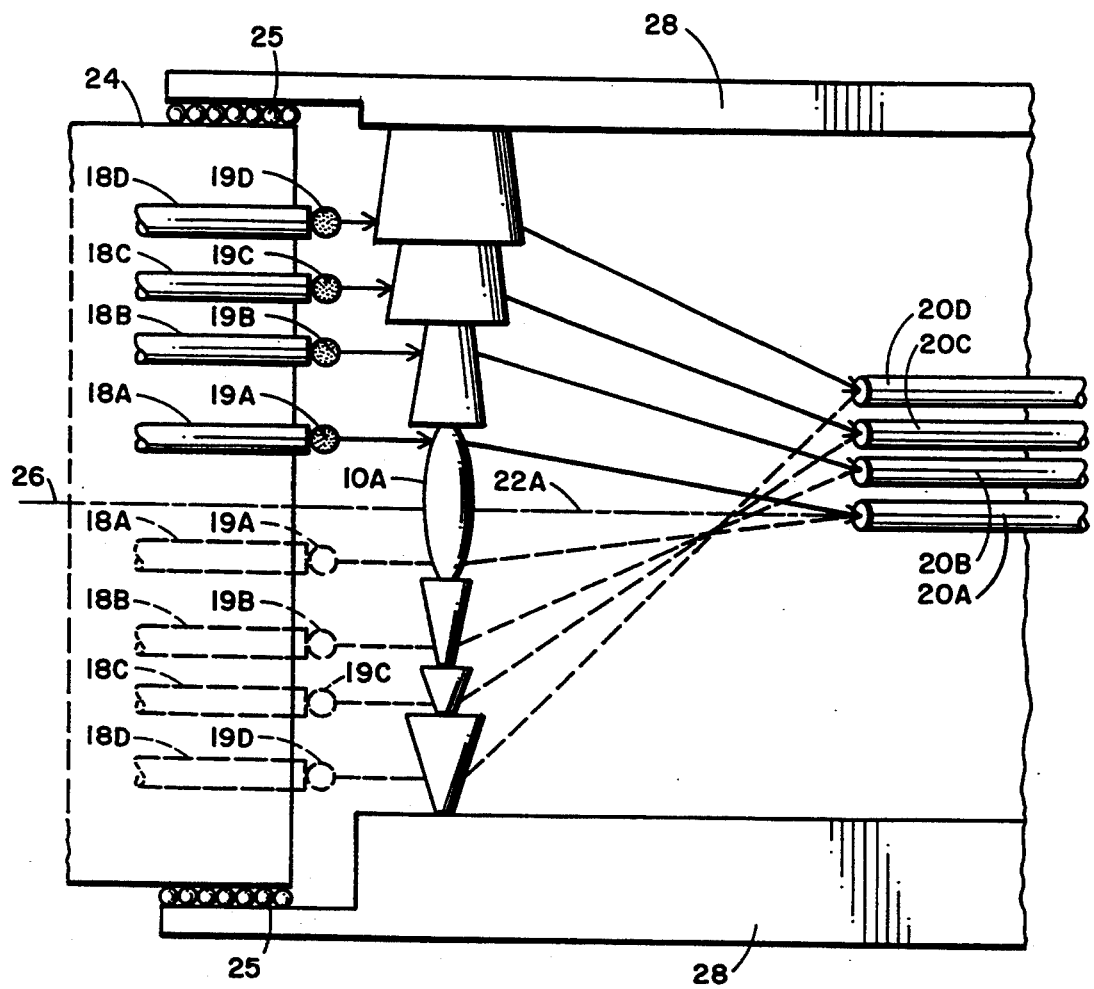
FIG. 5 illustrates how the lenses of FIG. 4 can be combined into the present invention to form a rotary interface between multiple optical conductors.

Referring to FIG. 4, the present invention incorporates a plurality of optical conductors 18A-18D each optically associated with a respective convex lens 10A-10D for coupling optical signals to corresponding optical conductors 20A-20D. Each lens 10A-10D has an optical axis 22A-22D on which a respective one of the receiving conductors 20A-20D is aligned. Each lens is designed to focus light at the same distance from the lens, i.e., the focal length f for each lens is identical. However, since the lenses 10A-10D are spaced in order to illustrate how the invention is implemented, the receiving conductor ends are also displaced from each other. In FIG. 5 the transmitting conductors 18A-18D are supported in a holding mechanism 24 which rotates about axis 26. The receiving conductors 20A-20D are held in a stationary holding mechanism 28 which also supports the lenses 10 so that the optical axis of each of the lenses remains centered on a respective one of the receiving conductors. A ball bearing interface 25 supports mechanism 24 within mechanism 28.

In order to prevent interference between optical signals through the lenses 10, it is necessary to remove portions of each lens so that optical signals from one of the conductors 18 passes only through one lens. The removed portions are indicated by cross-hatching in FIG. 4. Furthermore, it is desirable to remove the unnecessary portions of each lens 10 in such a manner as to allow the lenses to be nested into a lens assembly 30 as shown in FIG. 5. Starting with lens 10A in FIG. 4, which has an optical axis 22A coinciding with the axis of rotation 26, the outer edges 32 are removed to form an outer circumferential flat surface. The lens 10B is either cast or machined to remove a central portion at 34 of a diameter just sufficient to allow lens 10A to be inserted. The lens 10A can be adhesively bonded to lens 10B. A circumferential outer portion 36 of lens 10B is also removed in order to nest lens 10B into lens 10C. At lens 10C, an inner portion 38 is removed so that lens 10B can be nested into lens 10C. The outer portion 40 of lens 10C is removed and an inner portion 42 of lens 10D is removed so that lens 10C can nest inside lens 10D. The resulting configuration of lenses is shown in FIG. 5.

Referring to FIG. 5, the optical axes of the nested lenses 10 are offset by the spacing between the receiving optical conductors 20 since the optical axis of each lens 10 must coincide with the position of an associated one of the conductors 20 and the axis of rotation 26 only aligns with one of the optical axes. As discussed above, a light ray striking a convex lens on a line parallel to its optical axis will always focus at the lens focal point. The lenses 10 are formed or machined such that each of the conductors 18A-18D are always aligned on a corresponding lens 10A-10D. For example, the phantom line positions of conductors 18A-18D shows the effect of rotating the conductors through 180°. The optical signals from each conductor 18A-18D are still directed to the same one of the conductors 20A-20D.

Figure 6:
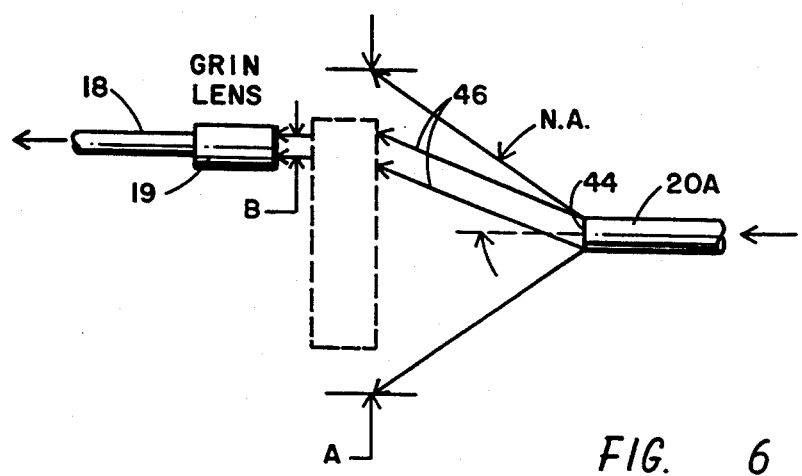
FIG. 6 illustrates how the present invention can be utilized as an optical isolator.

In addition to the simplified construction of the inventive coupler, the coupler also provides an advantage in those systems where unidirectional signal flow is desired, i.e., when it is desirable to prevent optical signals from transferring from conductors 20 to conductors 18. Referring to FIG. 6 and FIG. 2A, light exiting the open end 44 of conductor 20A is spread over a conical area defined by the numerical aperture (N.A.) of the conductor. Only that portion of light within the lines 46 traverses a path which can be refracted onto the lens 19 at the end of conductor 18. The loss in this reverse direction is proportional to the relationship $(B/A)^2$ where B is the diameter of the lens 19 and A is the diameter of the light beam at the lenses 10. Typical dimensions are $B \approx 0.1''$ and $A \approx 2''$ giving a loss in the reverse direction of about 95%. Thus, the inventive coupler functions as an optical isolator in the reverse direction.

The inventive coupler also functions with low losses in the forward direction. Each interface is selected to occur as close as possible to normal incidence, i.e., at 90° to the surface, which angle produces minimum reflection losses. The total number of optical interfaces in the system is four (not counting the GRIN lens to conductor interface). The resultant optical loss through the system is about 15%. A typical prior art system using prisms will have a loss of greater than 30%.

Accordingly, the present invention provides a simple rotary coupler with low forward transmission losses and high reverse transmission losses which enable it to function as an optical isolator. The invention can be used as an optical isolator without the rotary function.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. An optical coupler in combination with first and second sets of optical conductors, said coupler being used for coupling optical signals from said first set of optical conductors to said second set of optical conductors, the coupler comprising:

a plurality of annular lenses, each lens of the plurality of lenses being optically associated with one of the optical conductors of the first set, the lenses being nested one inside another to form a lens assembly oriented in a plane perpendicular to optical axes of the annular lenses;

first holding means for holding each of the conductors of the first set in parallel orientation with respect to an optical axis of a central one of said annular lenses, each conductor of the first set of conductors being positioned at a different radial distance from said optical axis of said central annular lens and having ends thereof positioned to direct light output at a corresponding one of said annular lenses; and second holding means for holding ends of each of the conductors of the second set at a focal point of a respective one of the annular lenses, said second holding means being coupled to said annular lenses for maintaining said conductors of the second set aligned with said lenses whereby light output from each of said conductors of the first set is focused onto an end of a respective one of said conductors of the second set.

2. The optical coupler of claim 1 and including a plurality of collimating lenses each connected to a respective one of said conductors of said first set for collimating light output from each of said conductors of the first set prior to said light output reaching said annular lenses.

3. The optical coupler of claim 2 wherein said collimating lenses each comprise a gradient index lens.

4. The optical coupler of claim 2 wherein said collimating lenses each comprise a ball lens.

5. The optical coupler of claim 2 wherein said annular lenses are positioned in relation to each conductor of said first and second sets of conductors so as to substantially inhibit light transfer in a direction from said second set of conductors to said first set of conductors.

6. An optical link having a unidirectional optical transmission path comprising:
   at least one convex lens having an optical axis passing therethrough;
   a first optical conductor oriented generally parallel to and offset from said optical axis and having one end terminating adjacent said lens;
   a second optical conductor having one end generally facing said lens and positioned on said optical axis at a focal point of said lens;
   a collimating lens connected to said one end of said first optical conductor for collimating light output therefrom;
   a plurality of nested, annular convex lenses each having an optical axis parallel to and displaced from said optical axis of said at least one convex lens, said nested annular lenses circumscribing said at least one convex lens;
   a plurality of third optical conductors oriented generally parallel to and radially displaced from said first optical conductor, each of said plurality of third optical conductors being optically associated with a respective one of said annular convex lenses and having an end terminating adjacent said respective one of said annular convex lenses;
   a plurality of fourth optical conductors each having an end facing said plurality of annular convex lenses with each said end aligned on a respective one of said optical axes of said annular convex lenses; and
   a plurality of collimating lenses positioned adjacent said ends of said third plurality of optical conductors for collimating light output therefrom.

7. A rotary optical coupler in combination with first and second sets of optical conductors, said coupler being used for coupling optical signals from said first set of optical conductors to said second set of optical conductors, the first set of conductors rotating with respect to the second set of conductors, the coupler comprising:
   a plurality of annular lenses, each lens of the plurality of lenses being optically associated with one of the optical conductors of the first set, the lenses being nested one inside another to form a lens assembly oriented in a plane perpendicular to said axis of rotation;
   first holding means for holding each of the conductors of the first set in parallel orientation with respect to an axis of rotation, each conductor of the first set of conductors being positioned at a different radial distance from said axis and having ends thereof positioned to direct light output at a corresponding one of said annular lenses; and
   second holding means for holding ends of each of the conductors of the second set at a focal point of a respective one of the annular lenses, said second holding means being coupled to said annular lenses for maintaining said conductors of the second set aligned with said lenses whereby light output from each of said conductors of the first set is focused onto an end of a respective one of said conductors of the second set.

8. The rotary optical coupler of claim 7 and including a plurality of collimating lenses each connected to a respective one of said conductors of said first set for collimating light output from each of said conductors of the first set prior to said light output reaching said annular lenses.

9. The rotary optical coupler of claim 8 wherein said collimating lenses comprise gradient index lenses.

10. The rotary optical coupler of claim 8 wherein said collimating lenses comprise ball lenses.

* * * * *